United States Patent [19]

Melzer et al.

[11] Patent Number: 4,863,546
[45] Date of Patent: Sep. 5, 1989

[54] APPARATUS AND METHOD FOR MANUFACTURING PLASTIC CARDS

[76] Inventors: Roland Melzer, Glatzer Weg 9; Rainer Melzer, Kaiserstr. 24, both of 5830 Schwelm, Fed. Rep. of Germany

[21] Appl. No.: 47,162

[22] Filed: May 6, 1987

Related U.S. Application Data

[63] Continuation-in-part of Ser. No. 779,593, Sep. 24, 1985, abandoned, which is a continuation of Ser. No. 517,574, Jul. 27, 1983, abandoned.

[30] Foreign Application Priority Data

Jul. 1, 1983 [EP] European Pat. Off. ............ 83106423

[51] Int. Cl.⁴ .............................................. B32B 31/08
[52] U.S. Cl. ............................. 156/308.2; 100/93 RP; 156/583.4; 156/583.5
[58] Field of Search .................... 156/252, 583.4, 282, 156/312, 308.2, 311, 324, 383, 384, 495, 498, 513, 581.3, 583.5, 583.4, 555, 522, 583.91; 100/145, 93 RP, 93 R, 153, 154, 151, 207; 226/74, 172; 198/692, 693, 833, 345; 270/37, 53; 271/202

[56] References Cited

U.S. PATENT DOCUMENTS 3,386,503  6/1968  Corning et al. .............. 156/583.4 X
3,608,801  9/1971  Nystrand ................... 226/74
3,669,327  6/1972  Dowd ...................... 226/74 X
4,060,441  11/1977  Ohta et al. ................ 156/495 X
4,334,468  6/1982  Güttinger et al. ............ 100/93 RP
4,336,096  6/1982  Dedekind .................... 156/583.5 X
4,383,882  5/1983  Held ....................... 156/583.5 X
4,406,719  9/1983  Mitsumoto et al. .......... 156/583.5 X

FOREIGN PATENT DOCUMENTS 44-11558   5/1969  Japan ..................... 156/583.5
57-165215  10/1982  Japan ..................... 156/583.5
0376652    5/1964  Switzerland .
0745628    2/1956  United Kingdom .

Primary Examiner—Raymond Hoch

[57] ABSTRACT

A method and equipment for manufacturing plastic cards, for example, credit cards and the like from a continuous layup including generally two plastic cover leaves and a printed insert. The plastic leaves to be heat sealed are fed through a plurality of press zones in which the lay-up is heated and subsequently cooled. The feed is performed by means of heat conducting, preferably metallic bands one of which carries pegs centrally disposed along its length which interengages with registration holes in the layup and a cooperating band to drive the bands and layup synchronously thorugh the press zones. Its use is in the mass production of plastic cards.

10 Claims, 3 Drawing Sheets

APPARATUS AND METHOD FOR MANUFACTURING PLASTIC CARDS

This application is a Continuation in Part of patent application Ser. No. 779,593 filed Sept. 24, 1985 which is a Continuation of patent application No. 517,574 filed July 27, 1983, now abandoned.

The invention concerns a method for manufacturing plastic cards such as bank cards, identity cards, credit cards, and the like. A further subject of the invention is a device for carrying out the method.

The plastic cards in question each consist of a printed insert, which can be provided by a single leaf printed on both sides or by two leaves each printed on one side and lying back to back, having a total thickness of about 0.5 millimeters, and two transparent cover leaves each of about 0.1 millimeter thickness, which overlie the printed material. The dimensional accuracy requirements of such cards, especially with respect to the registration and roughness of the outer surfaces, are extremely high. Manufacture of the cards is additionally made more difficult if a strip of magnetic material is also to be fixedly inset into the upper surface of one or both of the transparent cover leaves.

Previously, the fabrication was carried out in such a manner that a relatively large printed sheet of inserts was layered with correspondingly large sheets of transparent film, the sheets were registered with one another as much as possible, a large number of such layerings, for example, ten or more, were stacked on top of one another and then several of such stacks were stacked in a press with intermediate layers of heating plates and were heated and pressed together. The layerings, in general made of polyvinylchloride, therefore heat seal into correspondingly large plates which then are cut into individual cards. The actual heat sealing process takes place within about 30 minutes with the heating taking place fairly slowly. The cards made in this described manner require careful work in order to maintain the above-mentioned strict requirements. The described method is one also admitting of improvement with respect to other points.

The discontinuous operating sequence makes difficult the organization of the fabrication and the reject rate can be high. It requires numerous workers, which in the case of highly security sensitive articles - credit cards, bank cards, and the like is especially undesirable. If the cards carry an individual characterizing mark, such as a serial number, they further have to be sorted after being cut apart.

An object of the present invention is to provide a method and apparatus for manufacturing plastic cards, for instance, credit cards, identification cards and the like by heat sealing a layup of at least two plastic leaves under pressure and by subsequent cooling, which method and apparatus makes possible a continuous running of the process and an output of the finished cards in the sequence of the input of the printed inserts, and which method and apparatus also makes possible the delivery of cards of a constant good quality in an easily controlled way and with a small labor requirement.

SUMMARY OF THE INVENTION

In accordance with the invention, large printed sheets with a plurality of inserts arranged in columns and rows and equally large cover leaves are not used. Instead, a strip of printed inserts following one after another and similar strips, which later form the cover leaves, are used. As a result, in each press station, only one cut-off strip section is worked, and the finished laid up strips can then be stamped so that the cards naturally fall in the same sequence as exists in the input side. The use of bands which move with the strips brings considerable advantages with it. For one thing, transport of the bands along with the heat sealed plastic material from one station to the next is possible so that a correspondingly short cycle time is achieved. Secondly, the pull of the drive is not applied to the material to be sealed which in the warmed state is stretchable and cannot be used with a direct pull. And finally, because of the relatively thin bands, the total energy requirement for the heating and cooling is quite low.

BRIEF DESCRIPTION OF THE DRAWINGS

An exemplary embodiment of an arrangement for carrying out the method and apparatus according to the invention is shown in the accompanying schematic drawings in which.

DETAILED DESCRIPTION OF THE PREFERRED EMBODIMENTS

Figure 1:
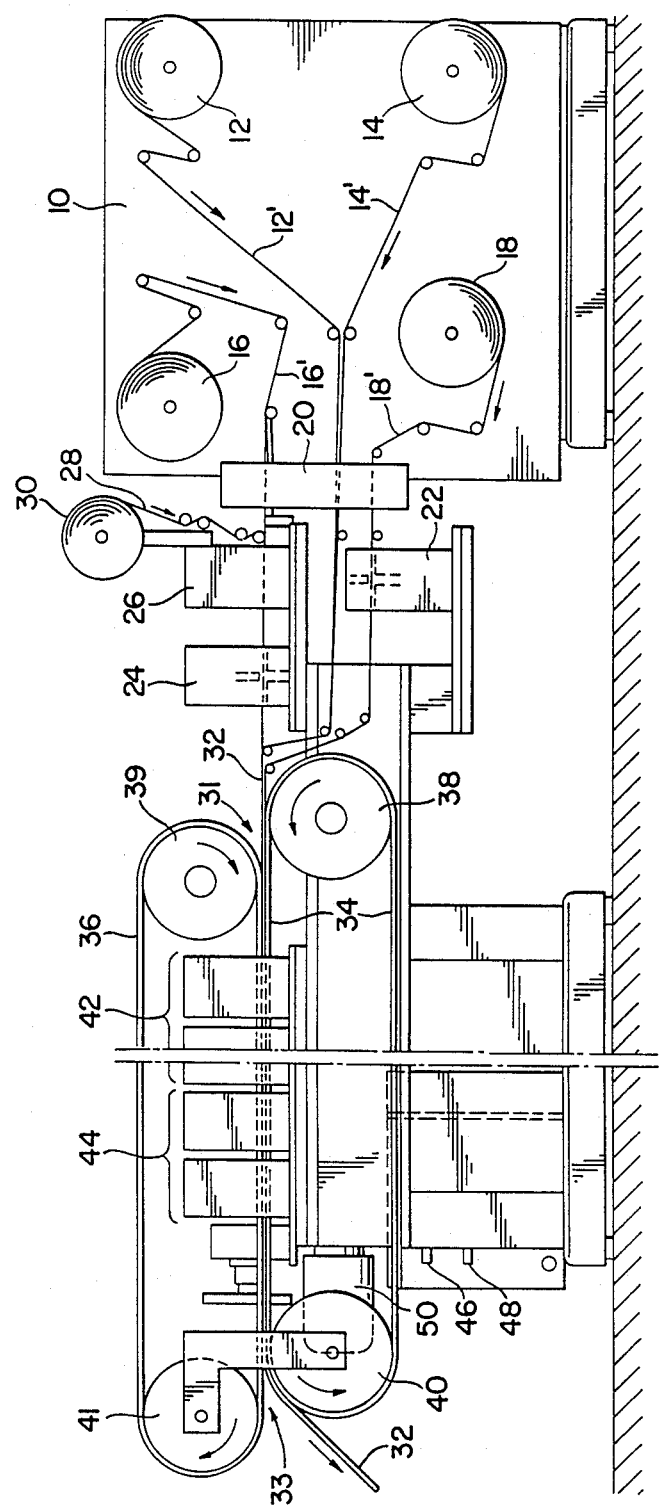
FIG. 1 shows schematically in side view the first machine group of a complete arrangement.

The supply bobbins for the strips worked in the process are journaled in a frame 10. The bobbins 12 and 14 deliver respectively an upper and a lower printed insert strip 12' and 14'. From each of the bobbins 16 and 18 runs a strip of transparent film 16' and 18'. In the event it is necessary that the printed areas of the two strips 12' and 14' lay above one another in a registered fashion, the usual and therefore non-illustrated control apparatus for this can be used.

All four strips 12', 14', 16', 18' run through an ionizing chamber 20 to make the strips free of any residual static electricity.

It is assumed that the insert strips 12', 14' already are registered with one another as a result of the printing process; that in the exemplary embodiment two printed areas lie on the strips next to one another, and that in the intermediate region between them are the openings. The corresponding stamping or hole punching stations could however also be arranged in the present arrangement behind the supply bobbins. These openings between printed areas are sensed, and the transparent film strip 18' extends through a corresponding controlled stamping or hole punching station 22, in which the strip is provided with holes in a registering manner.

A corresponding stamping or hole punching station 24 is also provided for the upper transparent film strip 16'; and in this case a sealing station 26 is also provided in which the outer surface of the strip 16' has sealed to it a magnetic trace which is removed from a support band 28 supplied from a bobbin 30. The respooling of the empty support band is not shown because of its simplicity.

By means of guide rolls, which are shown in the drawing but which need not be described in detail, the four strips 12′, 14′, 16′ with magnetic trace, and 18′ are now driven together and form a layup or layered construction 32 which enters into the nip 31 between metallic bands 34 and 36.

Figure 2:
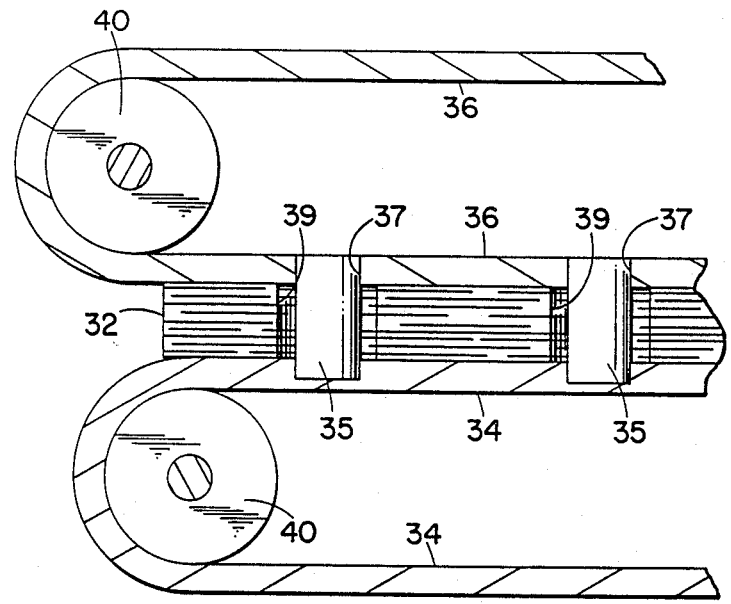
FIG. 2 shows schematically in an enlarged partial sectional view the peg and hole drive system of the invention of FIG. 1.
Figure 4:
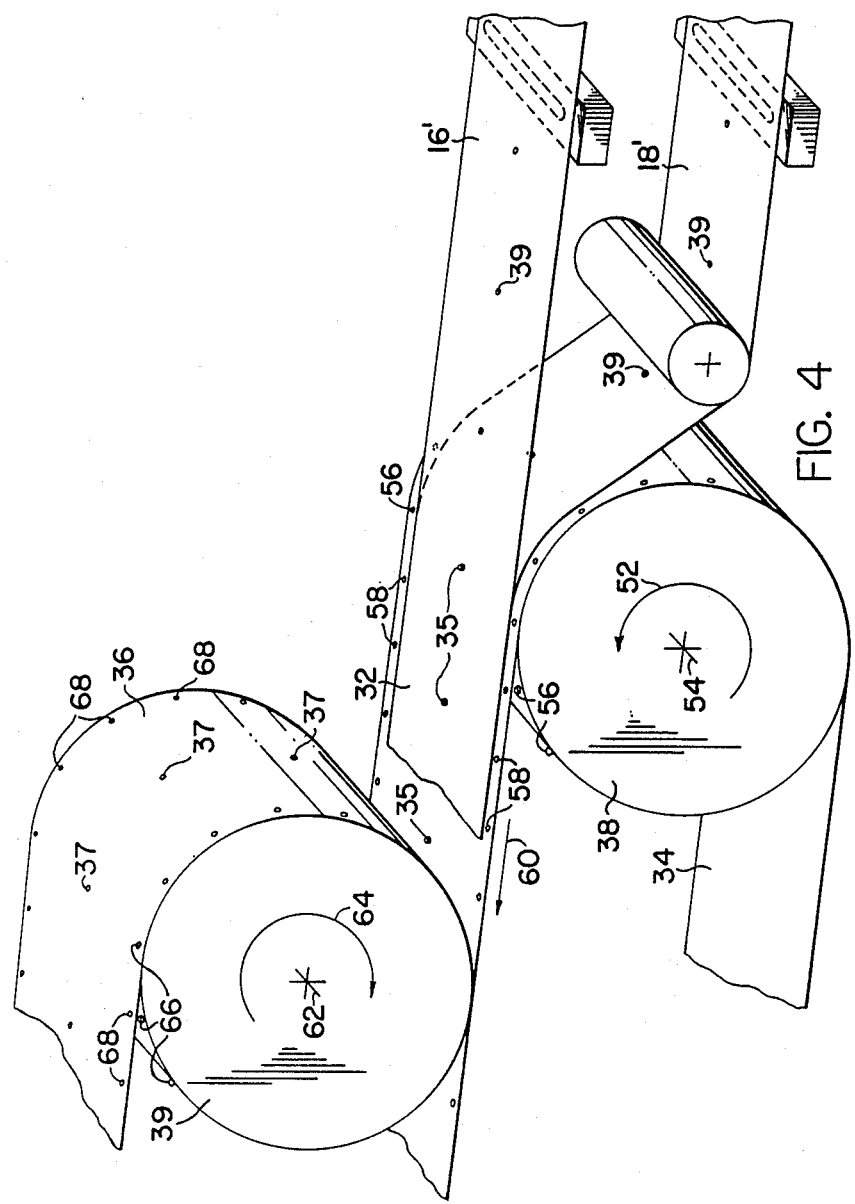
FIG. 4 shows schematically one embodiment of the drive roll and drive band pin and hole arrangement for driving one band and the peg and hole arrangement of the driven band for driving the other band and layup in unison.

The bands are endless and supported by input rolls 38 and 39 and output rolls 40 and 41. One of the bands, for example the lower band 34, is provided with pegs 35,35 as illustrated in FIGS. 2 and 4 and correspond to the registration holes 39,39 in the transparent film strips 16′ and 18′, and the other band—here the upper band 36—contains holes 37,37 which likewise align with the registration holes 39,39. Only one of the bands is driven in a stepwise manner and it takes with it the other band through the interengagement of the pegs 35,35 with the holes 39,39 of the layup 32 and with the holes 37,37 of the other band 36 as explained below.

The so-formed "strap" now runs through and between the upper and lower stamps of a number of presses, of which ten are provided in the illustrated apparatus and of which the first eight in the advancing direction, indicated at 42, are electrically heated, while the last two indicated at 44 are watercooled. The cooling water supply and removal takes place through the connections 46, 48.

The separate presses are individually adjustable with respect to their temperature and the pressure exerted by them, whereby the heating and cooling process takes place considerably faster than with the previously described customary process, so that the throughput of the equipment reaches an economical high value.

It will be understood that the presses open during the stepwise advancement of the "strap". Each heated press has adjacent its heated upper stamp—if necessary, the lower stamp is also heated—a lateral unheated holddown which holds the edges of the strap flat. This has the advantage that the actually used area of the layup 32 is stamped laterally from material which remains cold and which cannot flow.

Figure 3:
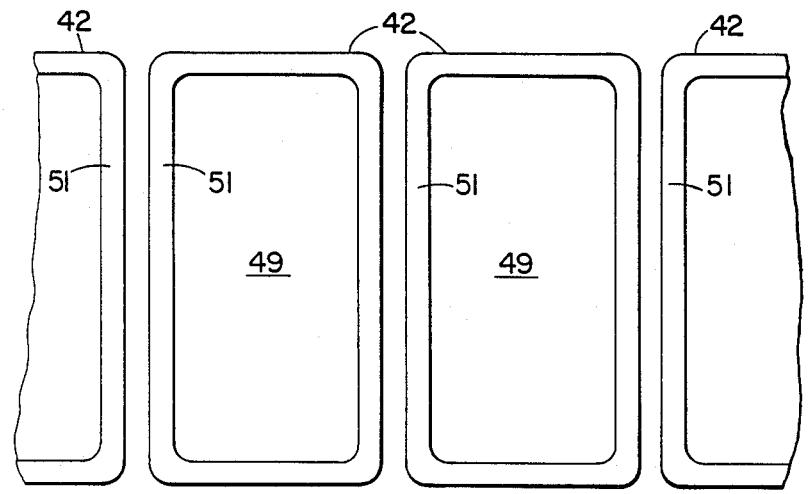
FIG. 3 shows schematically in an enlarged bottom view heated press members fitted with lateral hold-downs of the invention of FIG. 1.

In one embodiment of the apparatus, a heated press member 42 as illustrated in FIG. 3, has a heated portion 49 where a plastic card is to be formed from the layup and includes a cooling holddown portion 51 surrounding the heating portion. The laterally adjacent material of the heated portion of the layup remains cold so as to form a barrier against lateral flow of softened plastic material.

At the output end of the so far described equipment is the main drive motor 50, which effects the advancement of the material and also drives the stamping or hole punches 22,24. Also the reciprocation of the presses 42,44 can be drawn from it.

As mentioned above, the bands 34 and 36 adhere to the layup or layered construction when they are heated and then they lose such adhesion again when running through the cooling press 44, and the now sealed layup 32 exits from the output nip 33 between the bands in a self-supporting manner.

Turning now to FIG. 4, the peg and hole drive system of the invention is explained in further detail. For purposes of explanation, it is assumed that the input roll 38 is the drive roll and is connected to a driving motor not shown in FIG. 4. The drive roll 38 rotates in a direction indicated by the arrow 52 about a rotation axis shown generally 54. The lower endless band 34 is driven by means of radial pins 56,56 extending radially from each of the circumferential marginal areas at the sides of the drive roll 38. The spacing between the pins 56,56 is equal to the spacing between holes 58,58 located along the lateral marginal areas of the band 34. The pins 56,56 interengage with the holes 58,58 to drive the band 34 in the direction 60.

The belt 34 also includes a number of pegs 35,35 located along a line substantially midway between the lateral margins of the band 34. The pegs 35,35 are spaced apart from one another in an amount equal to the spacing between the registration holes 39,39 in the layup comprising in FIG. 4, the sheets 16′ and 18′. It is understood that inserts, or additional sheets comprising the layup also have registration holes 39,39 so that as the leaves of the layup and the insert are advanced to be fed into the nip of the apparatus, the pegs 35,35 fit in the registration holes 39,39 to align and maintain the leaves and insert comprising the layup in registration as the layup advances through the presses.

In addition to maintaining registration of the layup, the pegs 35 engage with registration holes 37,37 in the upper band 36 so that tractoring forces engage substantially symmetrically to drive the band in the direction 60. The upper roll 39 also includes pins 66,66 extending radially from each of the circumferential marginal areas at the sides of the roll. The pins 66,66 interengage with holes 68,68 located along the lateral marginal areas of the band 36 and causes the input roll 39 to rotate about its rotation axis 62 in a direction 64 when the drive roll 38 is driven. The driven wheel 39 also includes a centrally disposed groove around the circumference and substantially in line with the registration holes 37,37 to accommodate the tips of the pegs 35,35 carried on the band 34 as they pass in the vicinity of the roll 39.

The layup 32 is carried between the overlying surface areas of the bands 34,36 in the region formed between the lateral marginal areas carrying the drive holes of the bands in order to prevent pulling or stretching of the layup during the card producing process. The symmetrical tractoring synchronizes the two bands to prevent fluctuating motions in the lateral direction to maintain dimensional stability and accuracy of the layup and to insure registration of the leaves and printed inserts forming a desired plastic card. In addition, since the layup 32 is not carried by the pins and holes of the respective rolls and bands, any misalignment of the rolls 38,39 along their respective axes 54,62 does not affect synchronism of the bands which could otherwise translate into dimensional errors in the produced plastic card.

A further equipment group is associated with the equipment group described so far. The layup is now stable enough to be capable of being pulled without stretching; therefore, a feeding unit is provided which for example enters into the still available registration holes with pin sprockets. The feeding unit is superimposed on a station in which an embossed strip from an embossing press is applied. Behind the feeding unit is a stamping station in which the individual cards are stamped from the layup 32, and in a following grate removal station, the cards are separated from the waste-stamped grate while the finished cards are for example collected by means of a belt conveyor.

It is not compelling that four strips be heat sealed with one another; in the extreme case there are two strips lying back to back without covering films, or one middle strip printed on both sides with upper and lower covering layers. It is further not compelling that the films to be heat-sealed all be worked up from rolls. If, for example, a data storage member or an integrated circuit is to be inset, it may be practical to supply only one carrier strip from a roll and to lay up the insert and the further films by hand or automatically.

Although the above embodiments have been described using two endless metallic bands, an arrangment of endless chains could also be used to provide the desired results. Therefore, the invention has been described by way of illustration rather than limitation.

We claim:

1. A method for manufacturing and cutting plastic cards for instance credit cards, bank cards, identification cards and the like of the general type characterized by an insert having two transparent cover leaves by heat sealing a layup of an insert leaf printed on at least one side and an upper and lower cover layer under pressure and by subsequent cooling under pressure, said method comprising the steps of:

providing a layup including at least two plastic leaves at least one of which is in the form of an elongated strip;

providing two endless heat conducting metallic bands having adjacent overlying portions which pass in common through a plurality of press stations at least two of which are heating press stations and one of which is a cooling press station, each of said heating press stations being individually adjustable with respect to temperature and pressure;

intermittently driving one of said bands by means of a drive motor, one of said bands having pegs located along a line extending between lateral margins of said one band and the other of said bands having holes, said holes in said other band having the same spaced relation as said pegs on said one band which pegs and holes interengage so that the other of said bands is moved in unison with the driven one of said bands;

forming registration holes in said layup registering with said holes and pegs of said bands;

feeding said layup between said adjacent portions of said bands with said pegs passing through said registration holes so that said layup and said adjacent portions of said band form a strap wherein said layup is moved through said press stations by engagement with said bands and without any pull being exerted on said layup by said pegs;

providing a lateral unheated holddown adjacent each of said heating press stations, each heating press station having a predetermined heated area to heat a corresponding area of said layup to form a card, and portions of said layup laterally adjacent said heated layup area corresponding to said lateral unheated heated holddown and being non-heated so that the material of said layup in said laterally adjacent portions remains cold and cannot flow;

opening all of said press stations during each time said driven bend is moved in the course of said intermittent driving, and cutting plastic cards out of said layup after said layup passes through said plurality of press stations.

2. A method for manufacturing and cutting plastic cards according to claim 1 further characterized in that one of said plastic leaves making up said layup is fed as a strip into said bands, and the remaining plastic leaves making up said layup are laid on this strip as a carrier.

3. A method for manufacturing and cutting plastic cards according to claim 1 further characterized by at said heating press stations heating a predetermined area of said layup to form a card while portions of said layup laterally adjacent said areas are non-heated so that the material of said layup in said laterally adjacent portions remains cold and cannot flow.

4. A method for manufacturing and cutting plastic cards according to claim 1, wherein said insert has a thickness of about 0.5 mm and said cover leaves each have a thickness of about 0.1 mm.

5. A method for manufacturing and cutting plastic cards for instance credit cards, identification cards and the like of the type characterized by an insert having two transparent cover leaves by heat sealing a layup of an insert leaf printed on at least one side and an upper and lower cover layer under pressure and by subsequent cooling under pressure wherein a layup is provided, said layup including at least two plastic leaves at least one of which is in the form of an elongated strip, and wherein said layup is fed in a stepwise manner and in synchronism with an upper and a lower metallic band through a plurality of heating press stations, and wherein only one of said bands is driven through said plurality of heating press stations and a plurality of pegs carried on and located along a line extending between lateral margins of one of said bands passes through registration holes stamped in said layup and interengages with holes in the other of said bands and having the same spaced relation as said pegs on said one band so that the nondriven one of said bands and said layup are moved along with said driven one of said bands by said interengagement of said pegs and holes, and wherein for each card a predetermined area of said layup is heated to form a card while portions of said layup laterally adjacent and surrounding said heated areas are non-heated so that the material of said layup in said laterally adjacent portions remains cold so as to form a barrier against lateral flow of softened plastic material, and cutting said plastic cards out of said layup after said layup passes through said plurality of press stations.

6. Equipment for manufacturing and cutting plastic cards for instance credit cards, identification cards and the like from a continuous layup including two transparent cover leaves and an insert leaf printed on at least one side and which layup is heat sealed under pressure and subsequently cooled, said equipment comprising:

an upper endless smooth metallic band;

a lower endless smooth metallic band;

means supporting said upper and lower bands so as to provide adjacent overlying band portions extending and movable along a common path;

means for introducing a continuous layup of at least two plastic leaves between said adjacent overlying band portions;

said upper and lower bands being spaced between said adjacent overlying band portions and in close proximity to said respective upper and lower cover layers of said layup;

means in advance of said bands for forming registration holes in said layup, said registration holes being spaced apart a predetermined distance from one another and lying along a line extending between and substantially parallel to the lateral margins of said layup;

a plurality of presses located in succession along said path, each press having a pair of press members between which said adjacent overlying band portions pass, said presses being workable on said layup through said bands;

means for driving only one of said bands along said path;

a plurality of pegs carried on one of said bands and located along a line extending between lateral margins of said one band, said pegs being spaced apart from one another in an amount equal to said spacing between said registration holes in said layup, said pegs passing through said registration holes in said layup and into holes in the other of said bands, said holes in said other band having the same spaced relation as said pegs on said one band, said pegs on said one band interengaging said holes on said other band to drive said nondriven one of said bands and said layup synchronously along with said driven one of said bands;

at least some of said presses being heated pressures each having at least one or its two press members heated and having adjacent said heated press member a lateral unheated holddown, each heated press having a predetermined heated area to heat a corresponding area of said layup to form a card and portions of said layup laterally adjacent said heated layup area being nonheated so that the material of said layup in said laterally adjacent portions remains cold and cannot flow, and means following said plurality of presses for cutting out said plastic cards formed in said layup.

7. Equipment for manufacturing and cutting plastic cards as defined in claim 1 further characterized by each of said presses being adjustable to individually vary the pressure applied by it to said layup, and each of said presses having at least one of its press members adjustable in temperature individually of the press members of the other of said presses.

8. Equipment for manufacturing and cutting plastic cards as defined in claim 1 further characterized in the last one of said presses in the direction of feed of said bands along said path having a cooled press member for cooling the layup positioned between said bands, and said means for cutting said cards including a stamping mechanism following said last press for cutting out said plastic cards from said layup.

9. Equipment for manufacturing and cutting plastic cards as defined in claim 1 wherein each of said heated press members in a heated press has a heated portion where a plastic card is to be formed and a cooling holddown portion surrounding said heating portion so that the laterally adjacent material of said heated portion of said layup remains cold so as to form a barrier against lateral flow of softened plastic material.

10. Equipment for manufacturing and cutting plastic cards as defined in claim 1 wherein said means for driving said one band comprises a drive roll carrying a plurality of spaced apart pins extending radially from said drive roll along each of its circumferential marginal areas and said driven band including driving holes along the lateral marginal areas of said driven band, said holes being spaced apart from one another in an amount equal to said spacing between said pins along said drive roll marginal area, said marginal area carrying said pins being spaced apart a greater distance than the width of a said layup driven by said driven band.

* * * * *